(12) United States Patent
Lee

(10) Patent No.: US 10,423,053 B2
(45) Date of Patent: Sep. 24, 2019

(54) LIGHT PROJECTING SYSTEM OF HEAD-UP DISPLAY

(71) Applicant: TAN CIAN TECHNOLOGY CO., LTD., Taichung (TW)

(72) Inventor: Po Che Lee, Taichung (TW)

(73) Assignee: Tan Clan Technology Co., Ltd., Taichung (TW)

( * ) Notice: Subject to any disclaimer, the term of this patent is extended or adjusted under 35 U.S.C. 154(b) by 0 days.

(21) Appl. No.: 16/146,443

(22) Filed: Sep. 28, 2018

(65) Prior Publication Data

US 2019/0163040 A1 May 30, 2019

(30) Foreign Application Priority Data

Nov. 24, 2017 (TW) .............................. 106140857 A

(51) Int. Cl.
| | |
|---|---|
| G02B 27/10 | (2006.01) |
| G03B 21/14 | (2006.01) |
| G02B 27/01 | (2006.01) |
| G03B 21/28 | (2006.01) |

(52) U.S. Cl.
CPC ....... *G03B 21/145* (2013.01); *G02B 27/0101* (2013.01); *G03B 21/28* (2013.01); *G02B 2027/0185* (2013.01)

(58) Field of Classification Search
CPC .... G02B 27/01; G02B 27/0101; G03B 21/28; G03B 21/10; B60K 35/00
See application file for complete search history.

(56) References Cited

U.S. PATENT DOCUMENTS

| 7,508,356 | B2 * | 3/2009 | Kanamori | ............ | G02B 17/023 |
| | | | | | 345/7 |
| 10,139,620 | B2 * | 11/2018 | Yamazoe | ............... | B60K 35/00 |
| 2016/0202482 | A1 * | 7/2016 | Kuzuhara | .............. | G02B 27/01 |
| | | | | | 359/633 |

* cited by examiner

*Primary Examiner* — William C. Dowling
(74) *Attorney, Agent, or Firm* — Wang Law Firm, Inc.

(57) ABSTRACT

A light projecting system of a head-up display, which shows a plurality of virtual images on a windshield, includes at least a light source, a panel assembly, and a mirror assembly. The panel assembly includes a first panel generating a first projecting image and a second panel generating a second projecting image. The mirror assembly is provided between the panel assembly and the windshield to reflect the first projecting image of the first panel and the second projecting image of the second panel to image a first virtual image and a second virtual image on the windshield.

2 Claims, 7 Drawing Sheets

LIGHT PROJECTING SYSTEM OF HEAD-UP DISPLAY

BACKGROUND OF THE INVENTION

1. Technical Field

The present invention relates to a head-up display (HUD), and more particularly to a light projecting system of a HUD.

2. Description of Related Art

Typically, a conventional head-up display (HUD) projects driving information, data of dashboard, and a map onto a screen or a windshield. However, the conventional HUD only shows one of them on the screen, and the driver has to operate a panel to switch the information shown on the screen.

An improved HUD may project plural information onto the screen (or onto the windshield), so that the driver does not have to switch the screen. However, the images on the screen have the same image distance and are shown side-by-side. Therefore, the driver may not see the detail of the images in a short time that may cause danger in driving.

BRIEF SUMMARY OF THE INVENTION

In view of the above, the primary objective of the present invention is to provide a light projecting system of a HUD, which may shows plural virtual images with different image distances on a screen or a windshield.

The secondary objective of the present invention is to provide a light projecting system of a HUD, which allows a driver to switch images shown on a screen or a windshield according to his/her need.

In order to achieve the objectives of the present invention, a light projecting system of a head-up display, which shows a plurality of virtual images on a windshield, includes at least a light source; a panel assembly including a first panel and a second panel, wherein the first panel generates a first projecting image and the second panel generates a second projecting image; and the first panel is kept a predetermined distance from the second panel; and a mirror assembly between the panel assembly and the windshield to reflect the first projecting image of the first panel and the second projecting image of the second panel to image a first virtual image and a second virtual image on the windshield.

The first panel is not parallel to the second panel. The mirror assembly includes a first mirror, a second mirror, and a third mirror. The first projecting image of the first panel is projected to the windshield through the third mirror, the first mirror, and the second mirror in sequence, and the second projecting image of the second panel is projected to the windshield through the first mirror and the second mirror in sequence.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
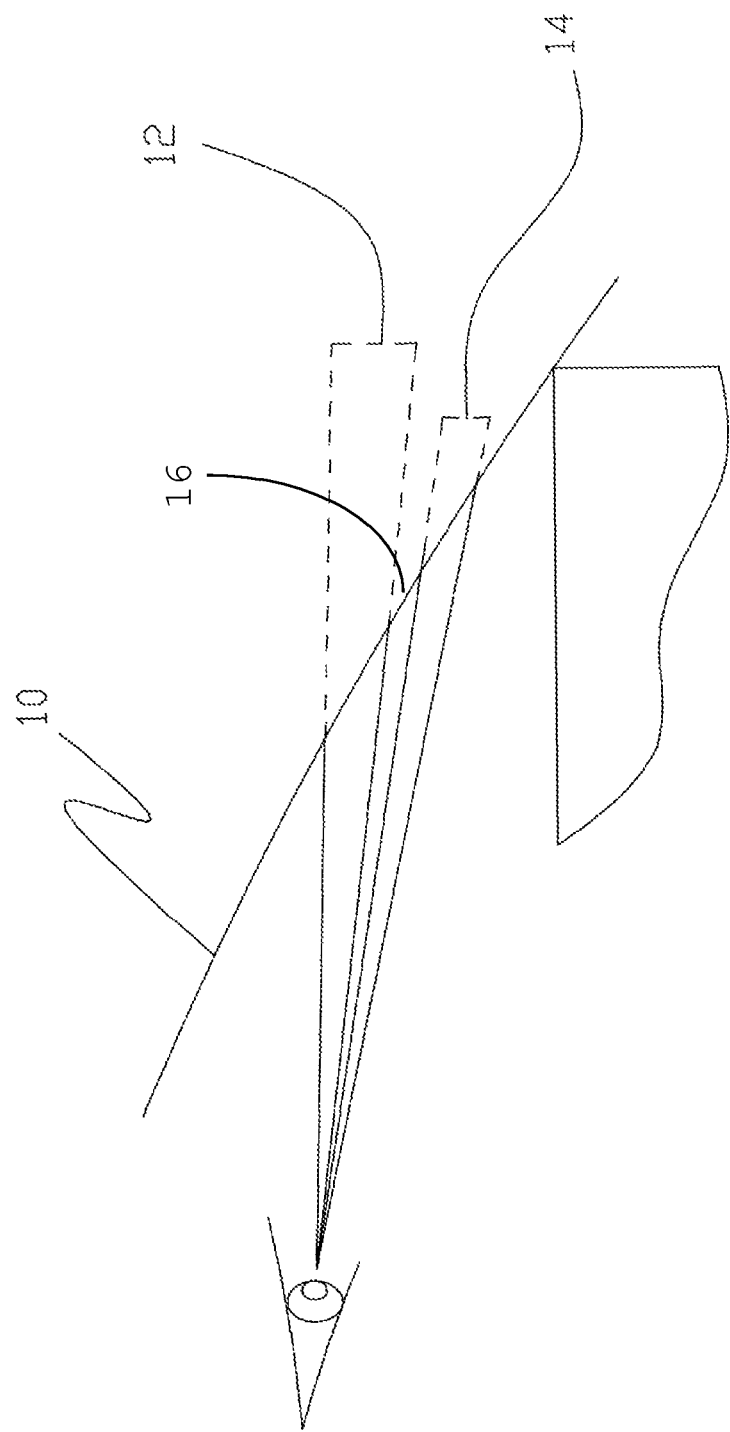
FIG. 1 is a sketch diagram of a first preferred embodiment of the present invention, showing two virtual images on the windshield.

As shown in FIG. 1, a light projecting system of a head-up display (HUD) of the first preferred embodiment may project two virtual images 12, 14 onto a windshield 10, and the virtual images 12, 14 have different image distances. In the present embodiment, the virtual images 12, 14 include data of a dashboard, a map, images of a dashcam, or other driving information. The virtual images 12, 14 on the windshield 10 are separated.

Figure 2:
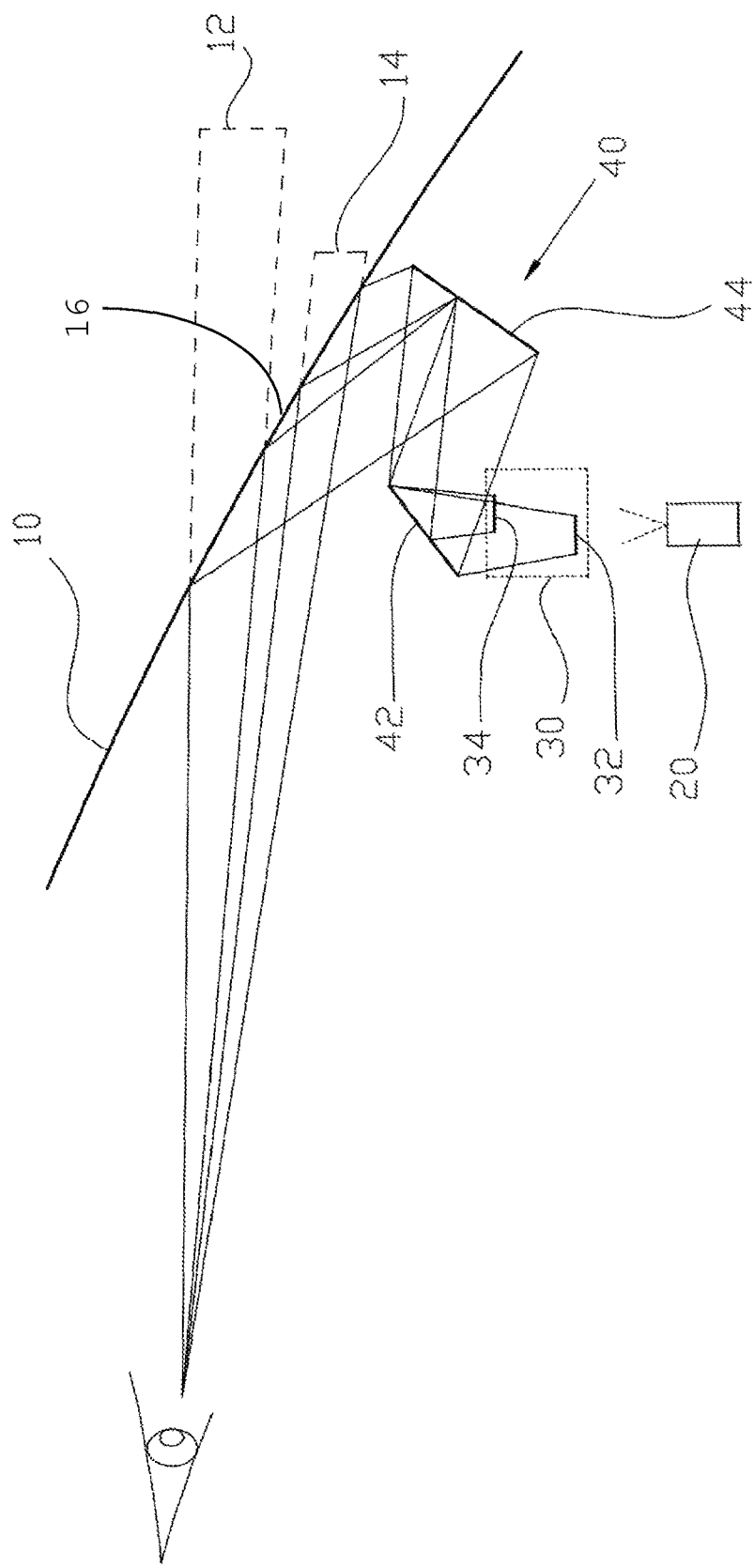
FIG. 2 is a sketch diagram of the light paths of the first preferred embodiment of the present invention.

As shown in FIG. 2, the light projecting system of the first preferred embodiment of the present invention includes at least a light source 20 to provide a beam. The light source 20 may be a laser beam emitting device or other equivalent devices.

The light projecting system includes a panel assembly 30, which includes a first panel 32 and a second panel 34, and the second panel 34 is separated from the first object 32. The light projecting system further includes a mirror assembly 40 between the screen assembly 30 and the windshield 10.

The first panel 32 is parallel to the second panel 34, and the first panel 32 has a portion overlapped with the second panel 34 in a light path of the light source 20. Precisely, the beam of the light source 20 emits to the first panel 32 and the second panel 34 to generate a first projecting image and a second projecting image, at least a part of the first projecting image of the first panel 32 is blocked by the second panel 34.

Therefore, the first projecting image and the second projecting image are projected onto the windshield 10 through the mirror assembly 40 to form a first virtual image 12 and a second virtual image 14. The first virtual image 12 and the second virtual image 14 are separated from each other and have different image distances.

The mirror assembly 40 includes a first mirror 42 and a second mirror 44 to reflect the beam from the first panel 32 and the second panel 34 to the windshield 10.

Figure 3:
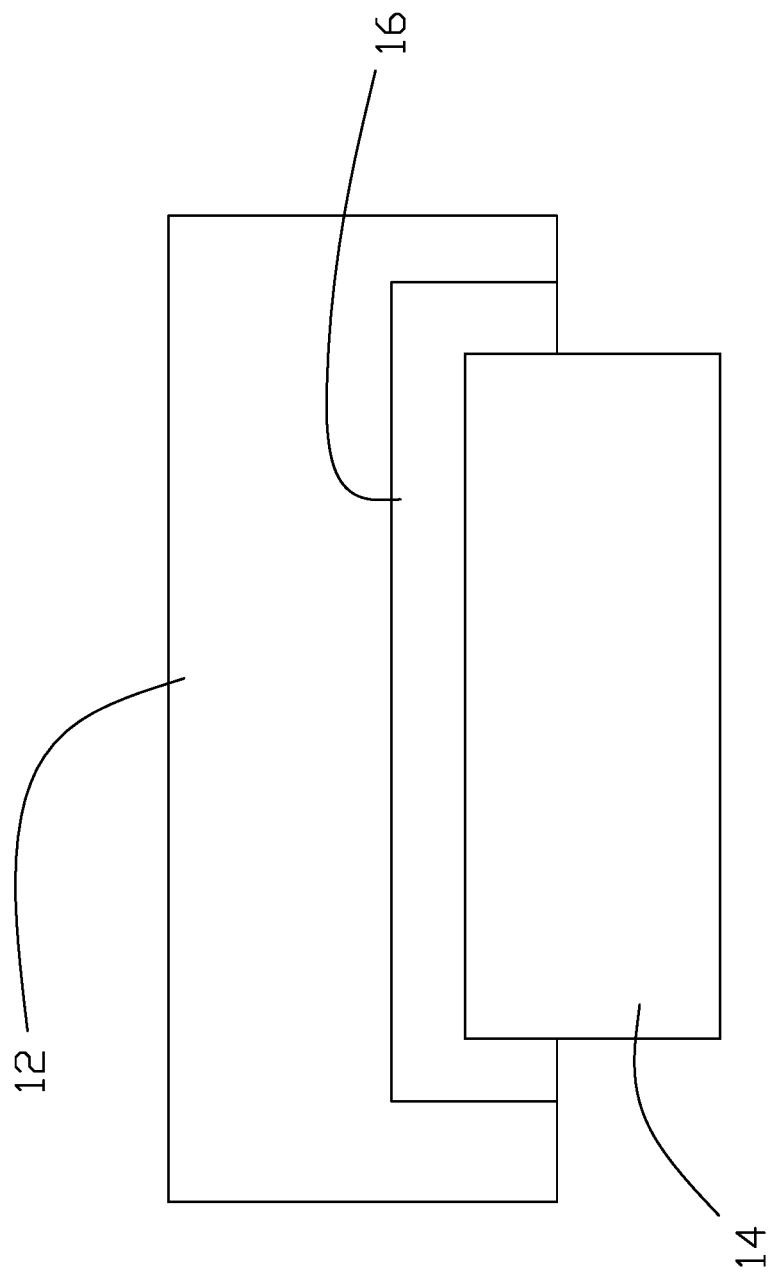
FIG. 3 is a sketch diagram of the first preferred embodiment of the present invention, showing the gap between the virtual images.

As shown in FIG. 2 and FIG. 3, in the paths of the beam transmitted to the windshield 10 from the first panel 32 and the second panel 34, the first panel 32 is further than the second panel 34. In other words, the first projecting image of the first panel 32 has a longer object distance than the second projecting image of the second panel 34. Therefore, an image distance of the first virtual image 12 is longer than that of the second virtual image 14. In addition, there is a gap 16 between the first virtual image 12 and the second virtual image 14 since a part of the first panel 32 is overlapped with the second panel 34. As a result, the first virtual image 12 is separated from the second virtual image 14, so that the driver may read the information of the first virtual image 12 and the second virtual image 14 easily.

Figure 4:
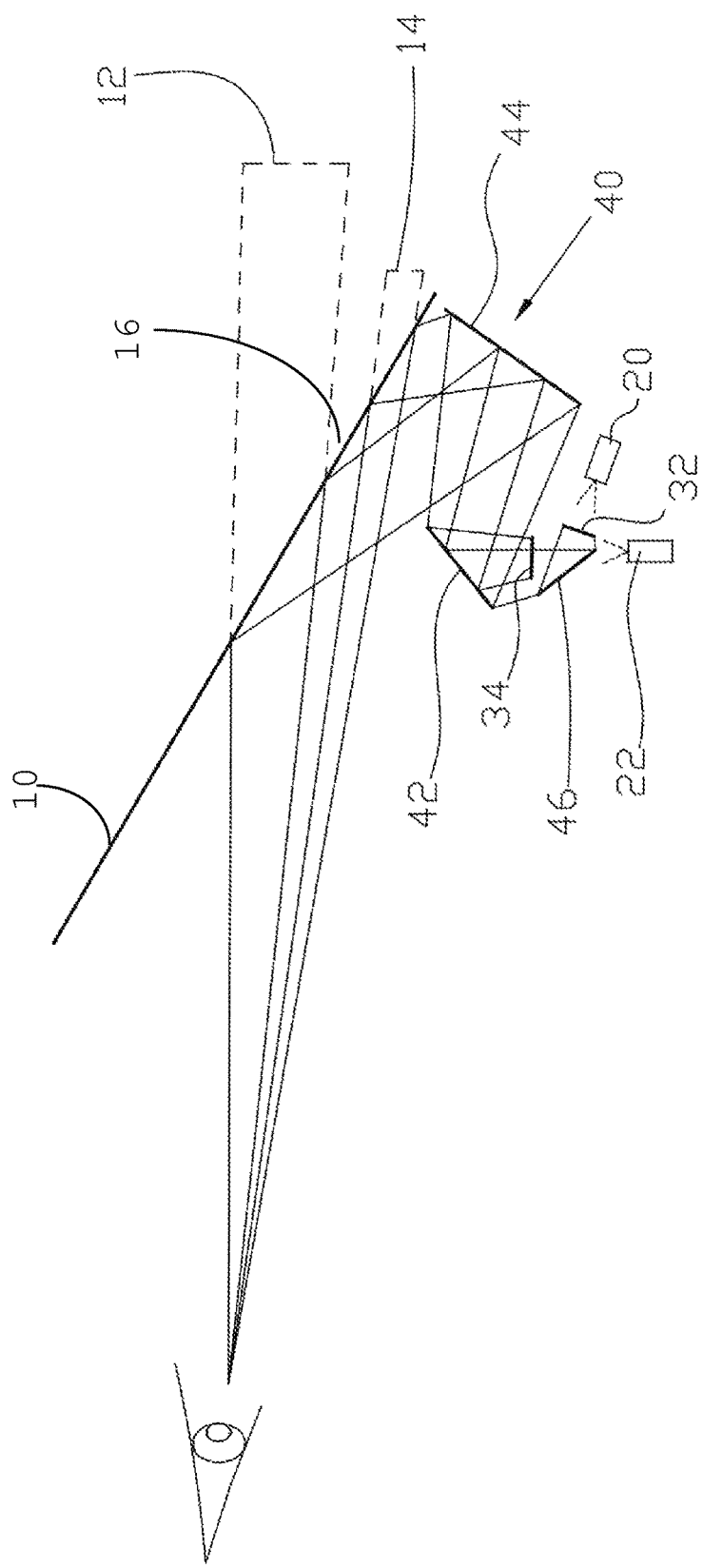
FIG. 4 is a sketch diagram of the light paths of a second preferred embodiment of the present invention.

FIG. 4 shows a light projecting system of a HUD of the second preferred embodiment of the present invention, which is the same as the first preferred embodiment, except that two light sources, a first light source 20 and a second light source 22, to project beams to the first panel 32 and the second panel 34 generate the first projecting image and the second projecting image respectively.

In the second preferred embodiment, the first panel 32 is not parallel to the second panel 34. A part of the beam of the first light source 20 projected to the first mirror 42 through the first panel 32 is blocked by the second panel 34, and the beam of the second light source 22 is not blocked by the first panel 32.

The second preferred embodiment further is provided with a third mirror 46 in a light path of the beam of the first light source 20 between the first panel 32 and the first mirror 42.

The beam of the first light source 20 emits to the first panel 32, and then is reflected by the third mirror 46, the first mirror 42, and the second mirror 44 in sequence to project the first projecting image onto the windshield 10. The beam of the second light source 22 emits to the second panel 34, and then is reflected by the first mirror 42 and the second mirror 44 in sequence to project the second projecting image onto the windshield 10.

As a result, the light projecting system of the second preferred embodiment of the present invention may generate the first virtual image 12 and the second virtual image 14 as shown in FIG. 3, and the first virtual image 12 and the second virtual image 14 are separated from each other and have different image distances.

Figure 5:
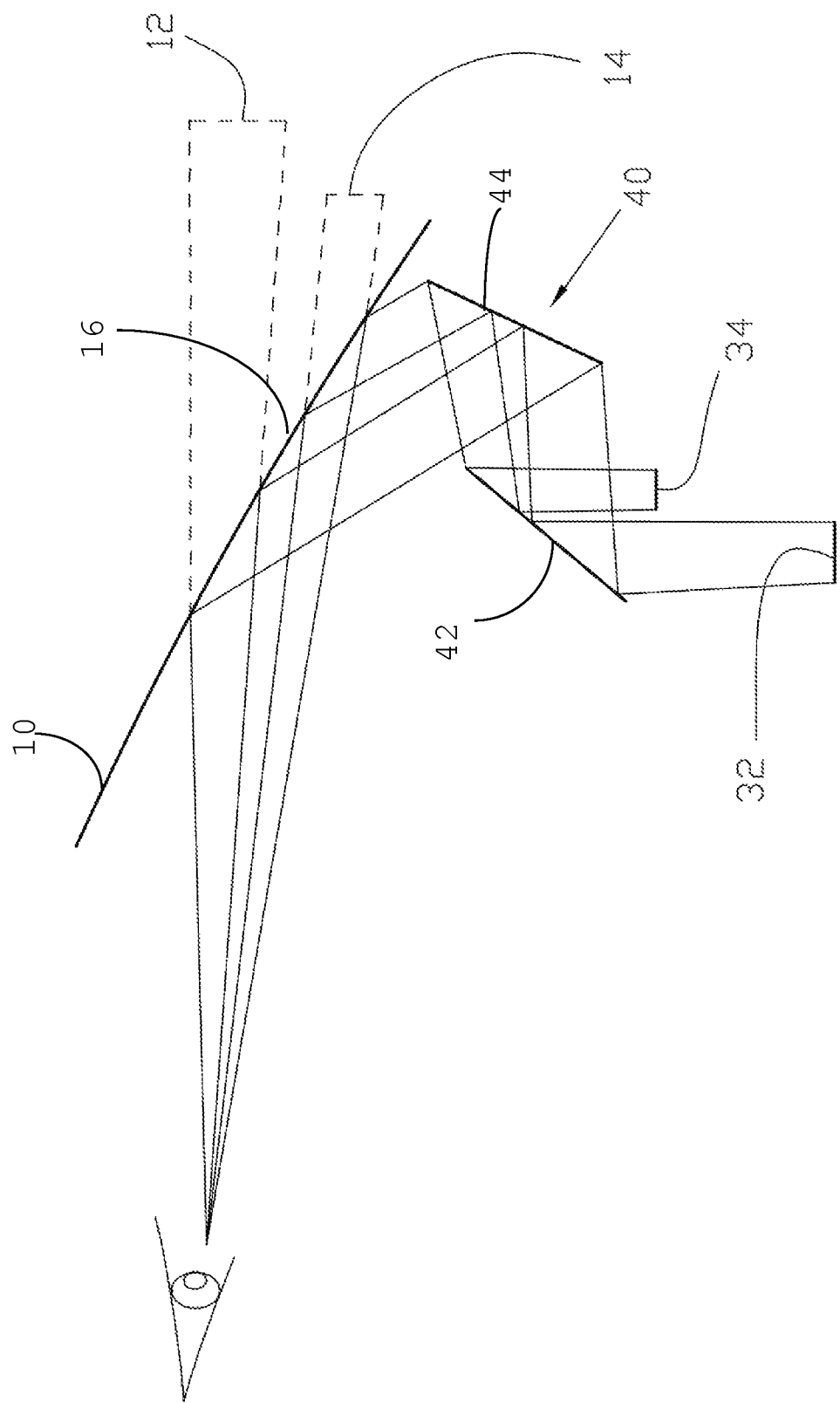
FIG. 5 is a sketch diagram of the light paths of a third preferred embodiment of the present invention.
Figure 6:
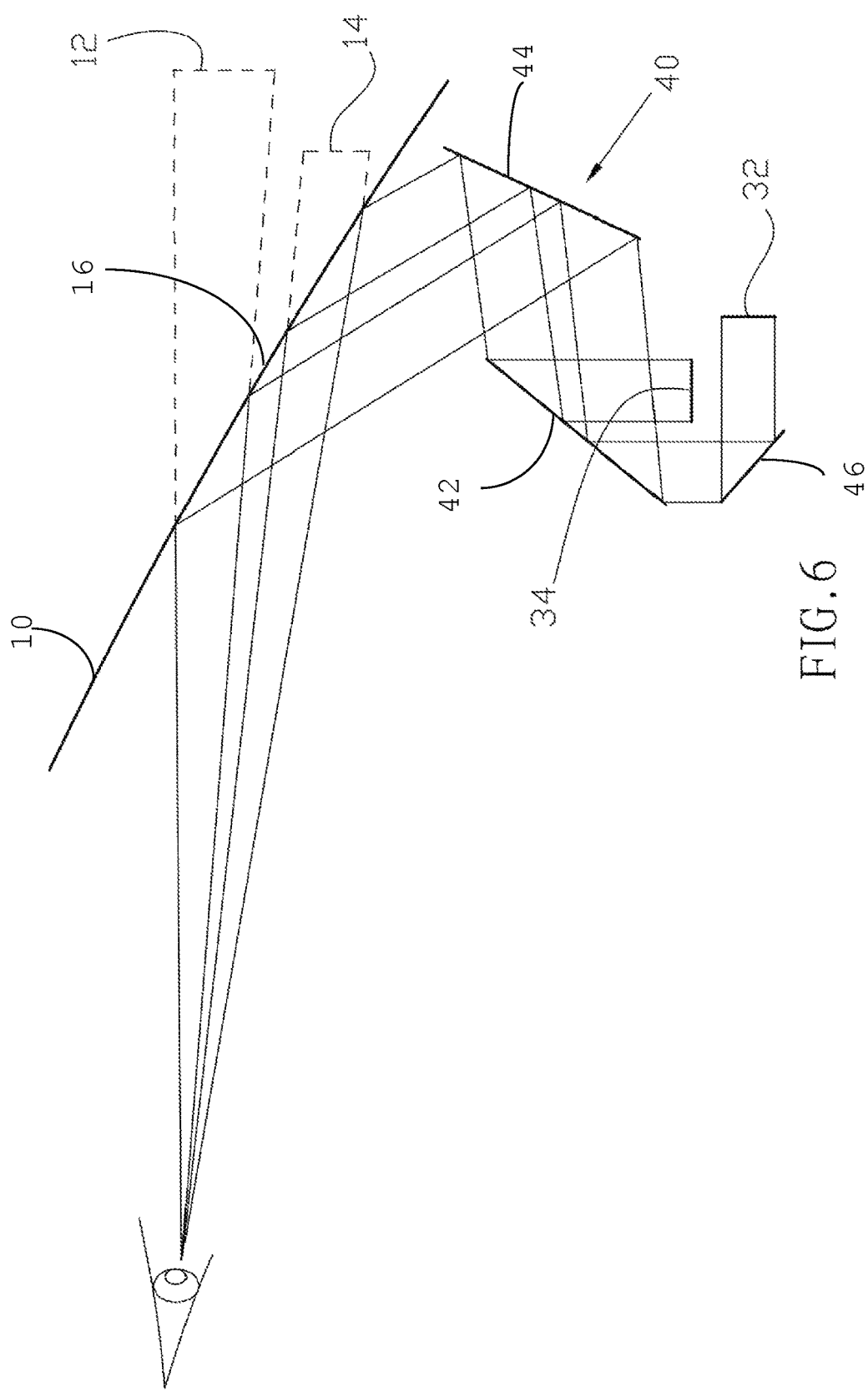
FIG. 6 is a sketch diagram of the light paths of a fourth preferred embodiment of the present invention.
Figure 7:
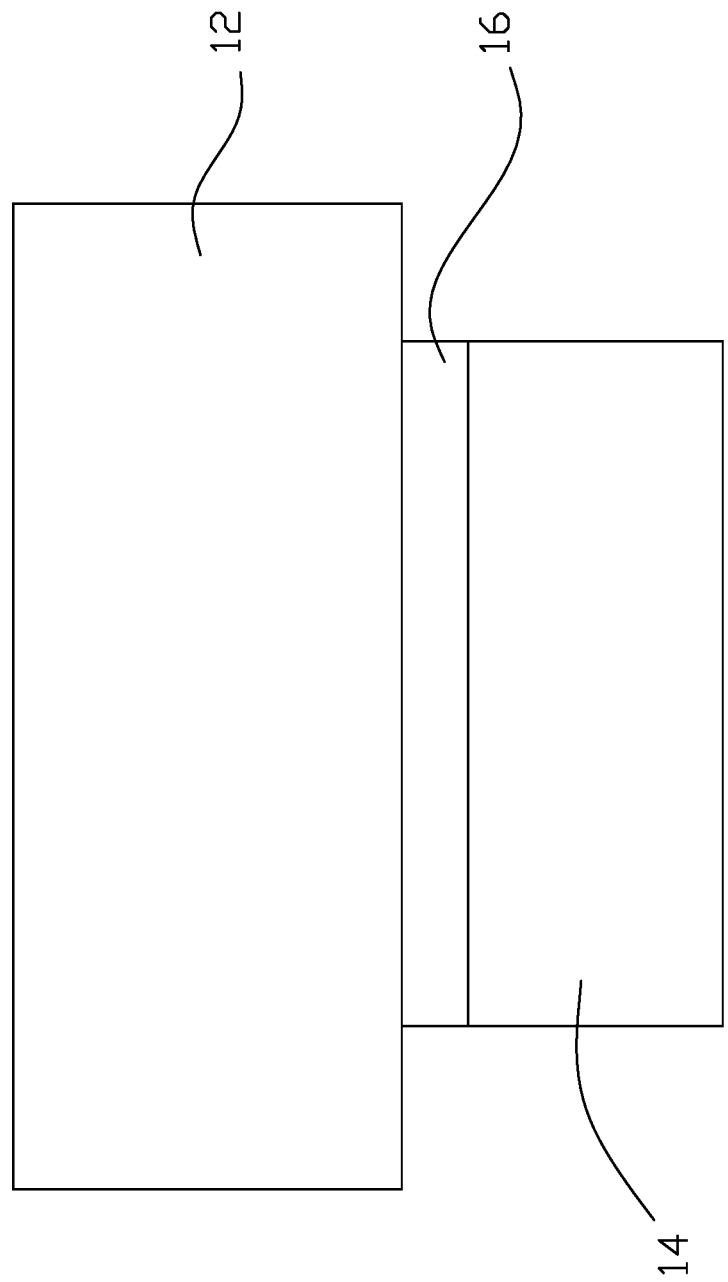
FIG. 7 is a sketch diagram of the fourth preferred embodiment of the present invention, showing the gap between the virtual images.

FIG. 5 and FIG. 6 show two light projecting systems of the third and the fourth preferred embodiments, in which the first panel 32 and the second panel 34 are not overlapped at all. As a result, a gap 16 is formed on the windshield 10 between the first virtual image 12 and the second virtual image 14 as shown in FIG. 7. A different part between the third and the fourth preferred embodiments is that the fourth preferred embodiment further is provided with a third mirror 46 between the first panel 32 and the first mirror 42.

In addition, the object distance of the first panel 32 is longer than that of the second panel 34, so that the image distance of the first virtual image 12 is longer than that of the second virtual image 14.

It must be pointed out that the embodiments described above are only some preferred embodiments of the present invention. All equivalent structures which employ the concepts disclosed in this specification and the appended claims should fall within the scope of the present invention.

What is claimed is:

1. A light projecting system of a head-up display, which shows a plurality of virtual images on a windshield, comprising:
    at least a light source;
    a panel assembly including a first panel and a second panel, wherein the first panel generates a first projecting image and the second panel generates a second projecting image; and the first panel is kept a predetermined distance from the second panel; and
    a mirror assembly between the panel assembly and the windshield to reflect the first projecting image of the first panel and the second projecting image of the second panel to image a first virtual image and a second virtual image on the windshield;
    wherein the first panel is not parallel to the second panel; the mirror assembly includes a first mirror, a second mirror, and a third mirror; the first projecting image of the first panel is projected to the windshield through the third mirror, the first mirror, and the second mirror in sequence, and the second projecting image of the second panel is projected to the windshield through the first mirror and the second mirror in sequence.

2. The light projecting system of the head-up display of claim 1, wherein a gap is formed between the first virtual image and the second virtual image.

\* \* \* \* \*